(12) United States Patent
Hu

(10) Patent No.: US 10,977,503 B2
(45) Date of Patent: Apr. 13, 2021

(54) FAULT ISOLATION FOR PERCEPTION SYSTEMS IN AUTONOMOUS/ACTIVE SAFETY VEHICLES

(71) Applicant: GM GLOBAL TECHNOLOGY OPERATIONS LLC, Detroit, MI (US)

(72) Inventor: Yao Hu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 16/541,421

(22) Filed: Aug. 15, 2019

(65) Prior Publication Data

US 2021/0049377 A1 Feb. 18, 2021

(51) Int. Cl.
*G06K 9/00* (2006.01)
*G06K 9/62* (2006.01)
*B60W 50/02* (2012.01)
*G06T 7/00* (2017.01)

(52) U.S. Cl.
CPC ..... *G06K 9/00805* (2013.01); *B60W 50/0205* (2013.01); *G06K 9/6202* (2013.01); *G06T 7/0002* (2013.01); *G06T 7/97* (2017.01); *B60W 2050/0215* (2013.01); *G06T 2207/20084* (2013.01); *G06T 2207/30261* (2013.01)

(58) Field of Classification Search
None
See application file for complete search history.

(56) References Cited

U.S. PATENT DOCUMENTS 10,354,462 B1 * 7/2019 Zhang ................. G07C 5/0808

* cited by examiner

*Primary Examiner* — Soo Jin Park
(74) *Attorney, Agent, or Firm* — Lorenz & Kopf, LLP

(57) ABSTRACT

In various embodiments, method, systems, and vehicles are provided that include: obtaining, via one or more sensors, sensor data pertaining including one or more images of one or more detected objects in proximity to a vehicle; processing the one or more images via a neural network model of a perception system of the vehicle, generating perception results for the one or more images; analyzing, via a processor, a plurality of potential faults in the perception system, based on the perception results, using a respective different technique for each of the plurality of potential faults, for the neural network model; determining a fault of the plurality of potential faults, via the processor, based on the analyzing; and taking a vehicle control action with respect to the vehicle, based on the fault, via instructions provided by the processor.

20 Claims, 10 Drawing Sheets

FAULT ISOLATION FOR PERCEPTION SYSTEMS IN AUTONOMOUS/ACTIVE SAFETY VEHICLES

TECHNICAL FIELD

The present disclosure generally relates to vehicles, and more particularly relates to systems and methods for detecting faults in perception systems in autonomous and active safety vehicles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle. In addition, certain vehicles (hereafter referred to as active safety vehicles) have active safety functionality (e.g., automatic braking, automatic steering, and so on) that provides a level of autonomous control, even when the vehicle is not fully autonomous in nature. Moreover, various vehicles (including autonomous vehicles and active safety vehicles) utilize perception systems (e.g., utilizing sensor data and processing using perception software) of detecting and identifying objects on the roadway on which the vehicle is travelling, for use in implementing control for such autonomous and/or active safety functionality for the vehicle.

While autonomous vehicles and active safety vehicles, and perception systems utilized thereby, offer many potential advantages over traditional vehicles, in certain circumstances it may be desirable for improved operation of such vehicles, including determination of faults in perception systems used in such vehicles.

Accordingly, it is desirable to provide systems and methods for operation of vehicles, such as autonomous vehicles and active safety vehicles, including detection and isolation of faults in perception systems for such vehicles. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes: obtaining, via one or more sensors, sensor data pertaining including one or more images of one or more detected objects in proximity to a vehicle; processing the one or more images via a neural network model of a perception system of the vehicle, generating perception results for the one or more images; analyzing, via a processor, a plurality of potential faults in the perception system, based on the perception results, using a respective different technique for each of the plurality of potential faults, for the neural network model; determining a fault of the plurality of potential faults, via the processor, based on the analyzing; and taking a vehicle control action with respect to the vehicle, based on the fault, via instructions provided by the processor.

Also in one embodiment, the step of taking the vehicle control action include relinquishing control of one or more automated functions for the vehicle.

Also in one embodiment, (i) the analyzing of the plurality of faults includes: (a) obtaining a ground truth for the one or more images; (b) generating one or more bounding boxes with respect to the perception results and the ground truth for the one or more images, including a respective bounding box for each of the one or more detected objects in the one or more images; (c) determining a bounding box correlation for each of the one or more bounding boxes; and (d) determining a respective class correlation between the perception results and the ground truth for each of the detected objects; and (ii) the determining of the fault includes determining whether a false positive fault, a false negative fault, or both for the one or more images are present, based on the bounding box correlations and the respective class correlations.

Also in one embodiment, the analyzing further includes determining an amount of time taken by the perception system in processing the one or more images; and the determining of the fault further includes determining whether a processing time fault is present, based on the amount of time.

Also in one embodiment, the analyzing further includes determining one or more differences between one or more variables between two consecutive frames of the images; and the determining of the fault further includes determining whether a temporal change fault is present, based on the one or more differences between the one or more variables between the two consecutive frames of the images.

Also in one embodiment, the analyzing further includes determining one or more differences in intensity between different pixels within a particular one of the images; and the determining of the fault further includes determining whether a spatial variance fault is present, based on the one or more differences in intensity.

Also in one embodiment, (i) the analyzing further includes: (a) determining an amount of time taken by the perception system in processing the one or more images; (b) determining one or more differences between one or more variables between two consecutive frames of the images; and (c) determining one or more differences in intensity between different pixels within a particular one of the images; and (ii) the determining of the fault further includes: (a) determining whether a processing time fault is present, based on the amount of time; (b) determining whether a temporal change fault is present, based on the one or more differences between the one or more variables between the two consecutive frames of the images; and (c) determining whether a spatial variance fault is present, based on the one or more differences in intensity.

In another embodiment, a system is provided that includes: (i) one or more sensors configured to generate sensor data pertaining including one or more images of one or more detected objects in proximity to a vehicle; and (ii) a processor coupled to the one or more sensors and configured to at least facilitate: (a) processing the one or more images via a neural network model of a perception system of the vehicle, generating perception results for the one or more images; (b) analyzing a plurality of potential faults in the perception system, based on the perception results, using a respective different technique for each of the plurality of potential faults, for the neural network model; (c) determining a fault of the plurality of potential faults based on the analyzing; and (d) providing instructions for taking a vehicle control action with respect to the vehicle, based on the fault.

Also in one embodiment, the processor is configured to at least facilitate: obtaining a ground truth for the one or more images; generating one or more bounding boxes with respect to the perception results and the ground truth for the one or more images, including a respective bounding box for each of the one or more detected objects in the one or more images; determining a bounding box correlation for each of the one or more bounding boxes; determining a respective class correlation between the perception results and the ground truth for each of the detected objects; and determining whether a false positive fault, a false negative fault, or both for the one or more images are present, based on the bounding box correlations and the respective class correlations.

Also in one embodiment, the processor is configured to at least facilitate: determining an amount of time taken by the perception system in processing the one or more images; and determining whether a processing time fault is present, based on the amount of time.

Also in one embodiment, the processor is configured to at least facilitate: determining one or more differences between one or more variables between two consecutive frames of the images; and determining whether a temporal change fault is present, based on the one or more differences between the one or more variables between the two consecutive frames of the images.

Also in one embodiment, the processor is configured to at least facilitate: determining one or more differences in intensity between different pixels within a particular one of the images; and determining whether a spatial variance fault is present, based on the one or more differences in intensity.

Also in one embodiment, the processor is further configured to at least facilitate: determining an amount of time taken by the perception system in processing the one or more images; determining one or more differences between one or more variables between two consecutive frames of the images; determining one or more differences in intensity between different pixels within a particular one of the images; determining whether a processing time fault is present, based on the amount of time; determining whether a temporal change fault is present, based on the one or more differences between the one or more variables between the two consecutive frames of the images; and determining whether a spatial variance fault is present, based on the one or more differences in intensity.

In another embodiment, a vehicle is provided having autonomous functionality, the vehicle including: (i) one or more sensors configured to generate sensor data pertaining including one or more images of one or more detected objects in proximity to the vehicle; (ii) a processor coupled to the one or more sensors and configured to at least facilitate: (a) processing the one or more images via a neural network model of a perception system of the vehicle, generating perception results for the one or more images; (b) analyzing a plurality of potential faults in the perception system, based on the perception results, using a respective different technique for each of the plurality of potential faults, for the neural network model; (c) determining a fault of the plurality of potential faults based on the analyzing; and (d) providing instructions for taking a vehicle control action with respect to the vehicle, based on the fault; and (iii) a vehicle actuator system coupled to the processor and configured to implement the vehicle control action in accordance with the instructions provided by the processor.

Also in one embodiment, the processor is configured to at least facilitate providing instructions for relinquishing control of one or more automated functions for the vehicle; and the vehicle actuator system is configured to at least facilitate implementing the relinquishing of control of the one or more automated functions of the vehicle in accordance with the instructions provided by the processor.

Also in one embodiment, the processor is further configured to at least facilitate: obtaining a ground truth for the one or more images; generating one or more bounding boxes with respect to the perception results and the ground truth for the one or more images, including a respective bounding box for each of the one or more detected objects in the one or more images; determining a bounding box correlation for each of the one or more bounding boxes; determining a respective class correlation between the perception results and the ground truth for each of the detected objects; and determining whether a false positive fault, a false negative fault, or both for the one or more images are present, based on the bounding box correlations and the respective class correlations.

Also in one embodiment, the processor is further configured to at least facilitate: determining an amount of time taken by the perception system in processing the one or more images; and determining whether a processing time fault is present, based on the amount of time.

Also in one embodiment, the processor is configured to at least facilitate: determining one or more differences between one or more variables between two consecutive frames of the images; and determining whether a temporal change fault is present, based on the one or more differences between the one or more variables between the two consecutive frames of the images.

Also in one embodiment, the processor is configured to at least facilitate: determining one or more differences in intensity between different pixels within a particular one of the images; and determining whether a spatial variance fault is present, based on the one or more differences in intensity.

Also in one embodiment, the processor is further configured to at least facilitate: determining an amount of time taken by the perception system in processing the one or more images; determining one or more differences between one or more variables between two consecutive frames of the images; determining one or more differences in intensity between different pixels within a particular one of the images; determining whether a processing time fault is present, based on the amount of time; determining whether a temporal change fault is present, based on the one or more differences between the one or more variables between the two consecutive frames of the images; and determining whether a spatial variance fault is present, based on the one or more differences in intensity.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
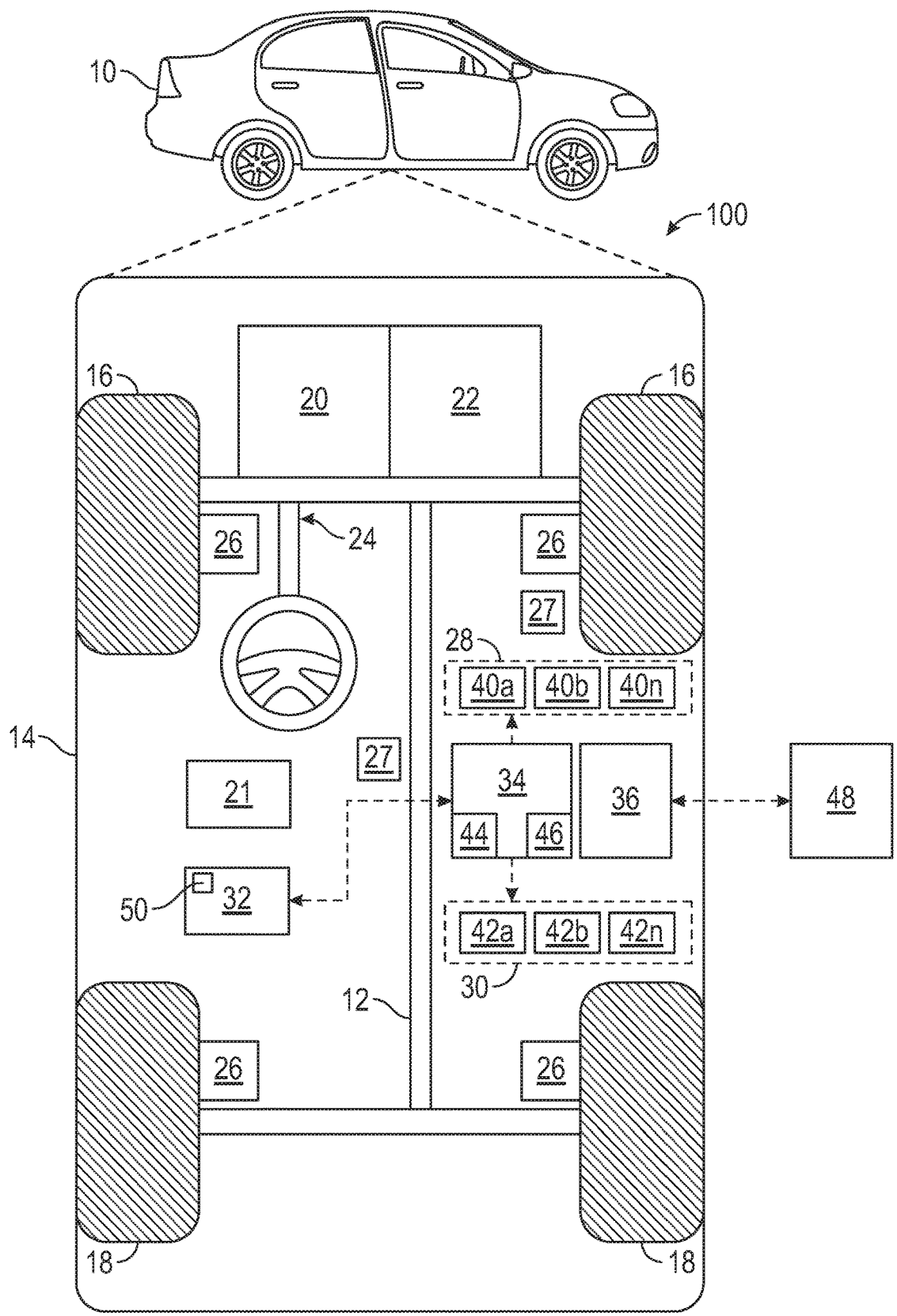
FIG. 1 is a functional block diagram illustrating a vehicle having a perception system, in accordance with various embodiments.

With reference to FIG. 1, a perception system shown generally as 100 is associated with a vehicle 10 (also referred to herein as a "host vehicle") in accordance with various embodiments. In general, the perception system (or simply "system") 100 provides for perception functions (e.g., detecting and analyzing objects in proximity to the vehicle 10 and implementing the analysis with various vehicle controls) along with determining of faults for the perception system.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 comprise a wheel assembly that also includes respective associated tires.

In various embodiments, the vehicle 10 is an autonomous vehicle, and the perception system 100, and/or components thereof, are incorporated into the vehicle 10. The vehicle 10 is, for example, a vehicle that is automatically controlled to carry passengers from one location to another. In certain other embodiments, the vehicle 10 comprises a vehicle with one or autonomous control functions, such as active (or automatic) braking, active (or automatic) steering, lane keep awareness, lane keep control, and so on. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous, non-autonomous, or other vehicle.

As shown, the vehicle 10 generally includes a propulsion system 20, a transmission system 22, a steering system 24, a brake system 26, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

In various embodiments, one or more user input devices 27 receive inputs from one or more passengers of the vehicle 10. In various embodiments, the inputs include a desired destination of travel for the vehicle 10. In certain embodiments, one or more input devices 27 comprise an interactive touch-screen in the vehicle 10. In certain embodiments, one or more inputs devices 27 comprise a speaker for receiving audio information from the passengers. In certain other embodiments, one or more input devices 27 may comprise one or more other types of devices and/or may be coupled to a user device (e.g., smart phone and/or other electronic device) of the passengers, such as the user device 54 depicted in FIG. 2 and described further below in connection therewith).

The sensor system 28 includes one or more sensors 40a-40n that sense observable conditions of the exterior environment and/or the interior environment of the vehicle 10. The sensors 40a-40n include, but are not limited to, optical cameras as well as, in certain embodiments, thermal cameras, radars, lidars, global positioning systems, ultrasonic sensors, inertial measurement units, and/or other sensors.

The actuator system 30 includes one or more actuators 42a-42n that control one or more vehicle features such as, but not limited to, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system. In various embodiments, the data storage device 32 stores a neural network model 50 for perception analysis for the vehicle, for example as described further below.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
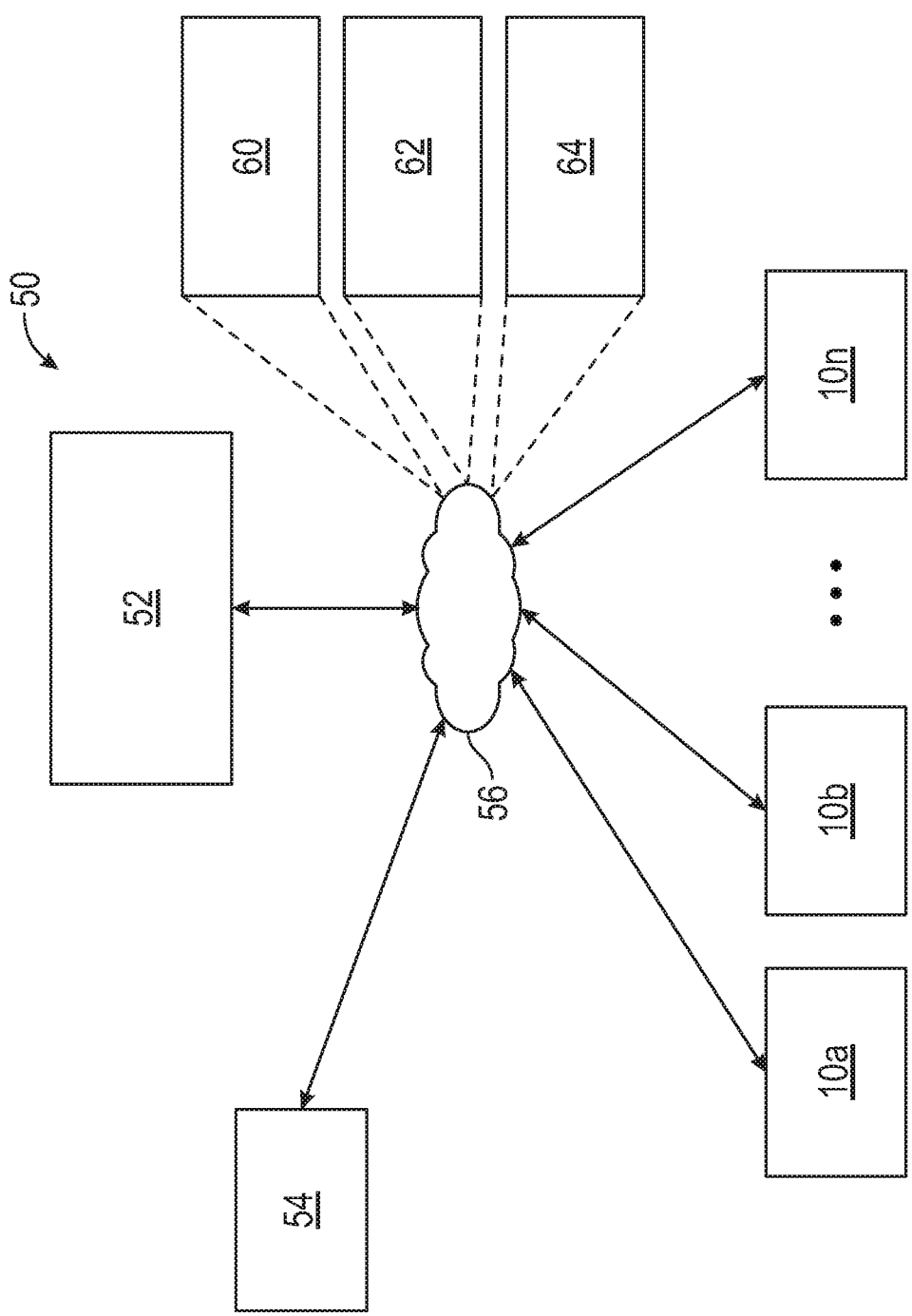
FIG. 2 is a functional block diagram illustrating a transportation system having one or more vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In certain embodiments, the communication system 36 is further configured for communication between the sensor system 28, the input device 27, the actuator system 30, one or more controllers (e.g., the controller 34), and/or more other systems and/or devices (such as, by way of example, the user device 54 depicted in FIG. 2 and described further below in connection therewith). For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

In various embodiments, the processor 44 of FIG. 1 utilizes the neural network model 50 (referenced above) for performing autonomous tasks for the vehicle 10 (e.g., including automatic braking, automatic steering, and/or other autonomous tasks associated with an autonomous vehicle and/or active safety vehicle). In various embodiments, the neural network is stored in the data storage device 32 and/or other non-transitory computer storage memory of the vehicle 10. Also in various embodiments, the neural network model 50 utilizes machine learning, with various inputs and internal variable used to generate outputs for various automatic vehicle control functions, including processing and analysis of detected objects in optical images captured by one or more optical cameras of the sensor 40 of the vehicle 10, in various embodiments (e.g., as described further below in connection with FIG. 6). In addition, in various embodiments, the processor 44 is further configured to determine one or more types of various potential faults for the perception system 100, including for the processing and usage of the digital images, utilizing the techniques described herein.

With further reference to FIG. 1, in certain embodiments, the perception system 100 may include certain components of the vehicle 10 (rather than the entire vehicle 10), such as the sensor system 28, sensors 40, controller 34, processor 44, media 46, communication system 36, data store device 32, and neural network model 50. In addition, in certain embodiments, these various components may also be used by various other systems of the vehicle 10 at the same time.

With reference now to FIG. 2, in various embodiments, the vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more vehicles 10a-10n as described with regard to FIG. 1. In various embodiments, the operating environment 50 (all or a part of which may correspond to entities 48 shown in FIG. 1) further includes one or more user devices 54 that communicate with the vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the vehicles 10a-10n to schedule rides, dispatch vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline vehicle 10 and/or a vehicle based remote transportation system 52. To this end, a vehicle and vehicle based remote transportation system can be modified, enhanced, or otherwise supplemented to provide the additional features described in more detail below.

Figure 3:
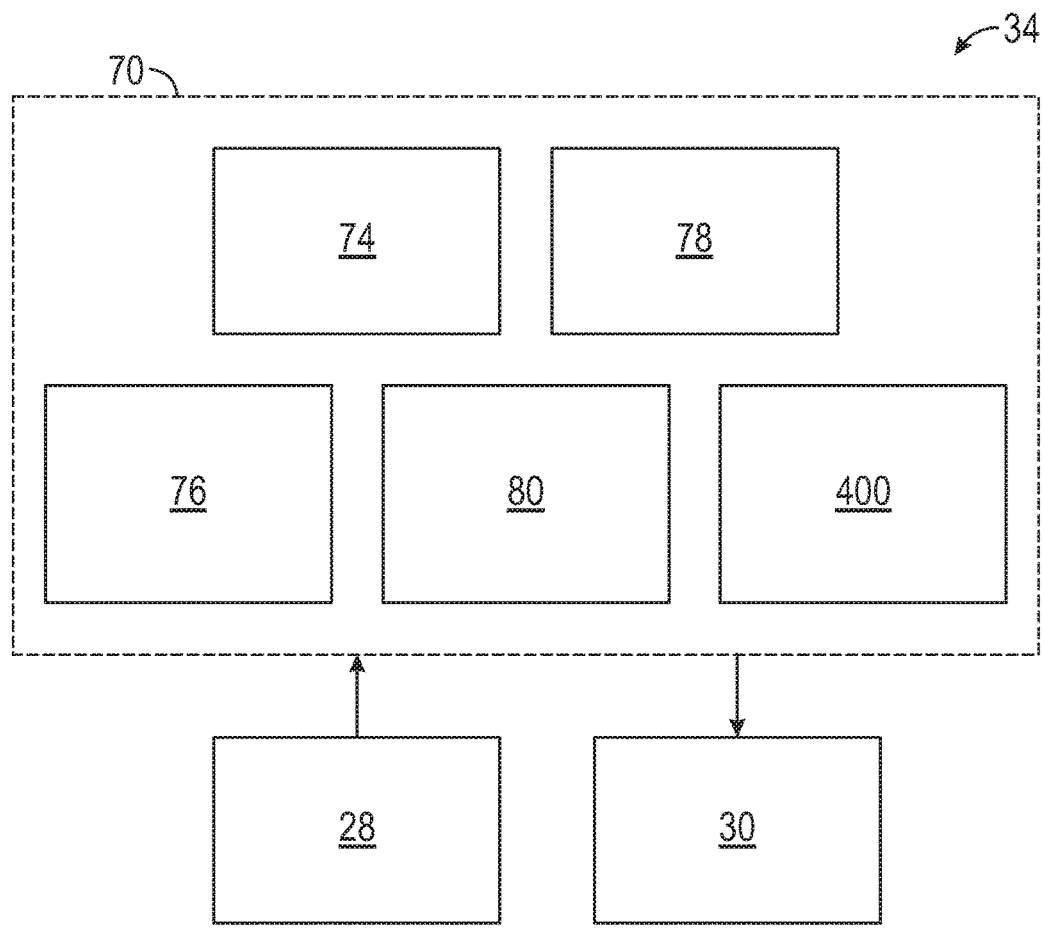
FIG. 3 is functional block diagram illustrating an autonomous driving system (ADS) having a perception system associated with the vehicle of FIG. 1, in accordance with various embodiments.

In accordance with various embodiments, the controller 34 implements an autonomous driving system (ADS) as shown in FIG. 3. That is, suitable software and/or hardware components of the controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, and the like) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, as discussed above with regard to FIG. 1, one or more instructions of the controller 34 are embodied in the perception system 100, for performing perception analysis for objects detected in images obtained from a camera and/or other sensor data, and for exercising automated vehicle control (e.g., of steering, braking, and/or other vehicle functions), based at least in part on any faults determined for the perception system 100. In various embodiments, all or parts of the perception system 100 may be embodied in the computer vision system 74 and/or one or more other vehicle systems, and/or the vehicle control system 80 or may be implemented as a separate system (referred to as a perception system 400), as shown.

Figure 4:
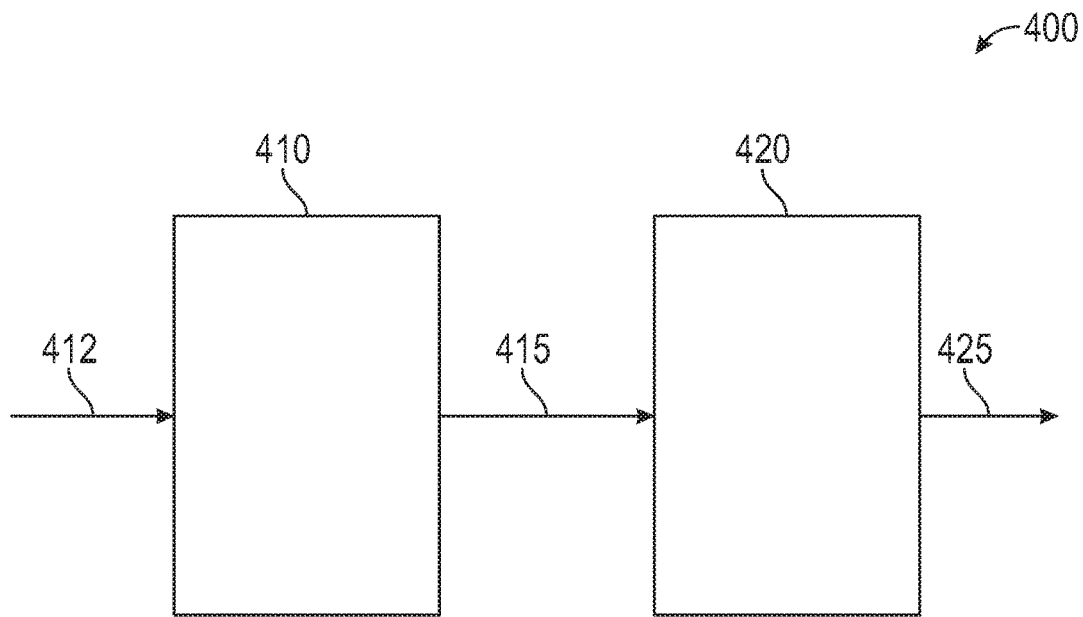
FIG. 4 is a functional block diagram illustrating the perception system, in accordance with various embodiments.

Referring to FIG. 4 and with continued reference to FIG. 1, the perception system 400 generally includes a detection module 410 and a processing module 420. In various embodiments, the detection module 410 and the processing module 420 are disposed onboard the vehicle 10. As can be appreciated, in various embodiments, parts of the perception system 400 may be disposed on a system remote from the vehicle 10 while other parts of the perception system 400 may be disposed on the vehicle 10.

In various embodiments, the detection module 410 receives sensor data 412 from various sensors 40a-40n of the vehicle 10 (including a camera and, in certain embodiments, lidar sensors, radar sensors, and so on). The detection module 410 gathers the sensor data 412 in order to obtain information pertaining to a roadway on which the vehicle 10 is travelling, including objects along the roadway (e.g., including other vehicles, bicycles, pedestrians, and so on). In various embodiments, the detection module 410 gathers this information and generates observational data 415 as outputs for the detection module 410, which are provided to the processing module 420 described below.

The processing module 420 receives the observational data 415 from the detection module 410, performs analysis using the received observational data 415, including the determining and isolating of faults in the perception system 100 (e.g., including faults as to the processing of images from the vehicle sensors pertaining to the detected objects). Also in various embodiments, the processing module 420 generates instructions 425 as appropriate for operation of the vehicle 10. For example, in various embodiments, the processing module 420 generates instructions 425 for operation of the vehicle 10 to adjust automated control of one or more vehicle functions (e.g., automatic braking, automatic steering, and so on, for implementation via an automatic driving system, such as the ADS 70 of FIG. 3, and/or components thereof, and/or vehicle actuators, such as for the steering system 24, the brake system 26, and/or the actuators 42a . . . 42n of FIG. 1).

Figure 5:
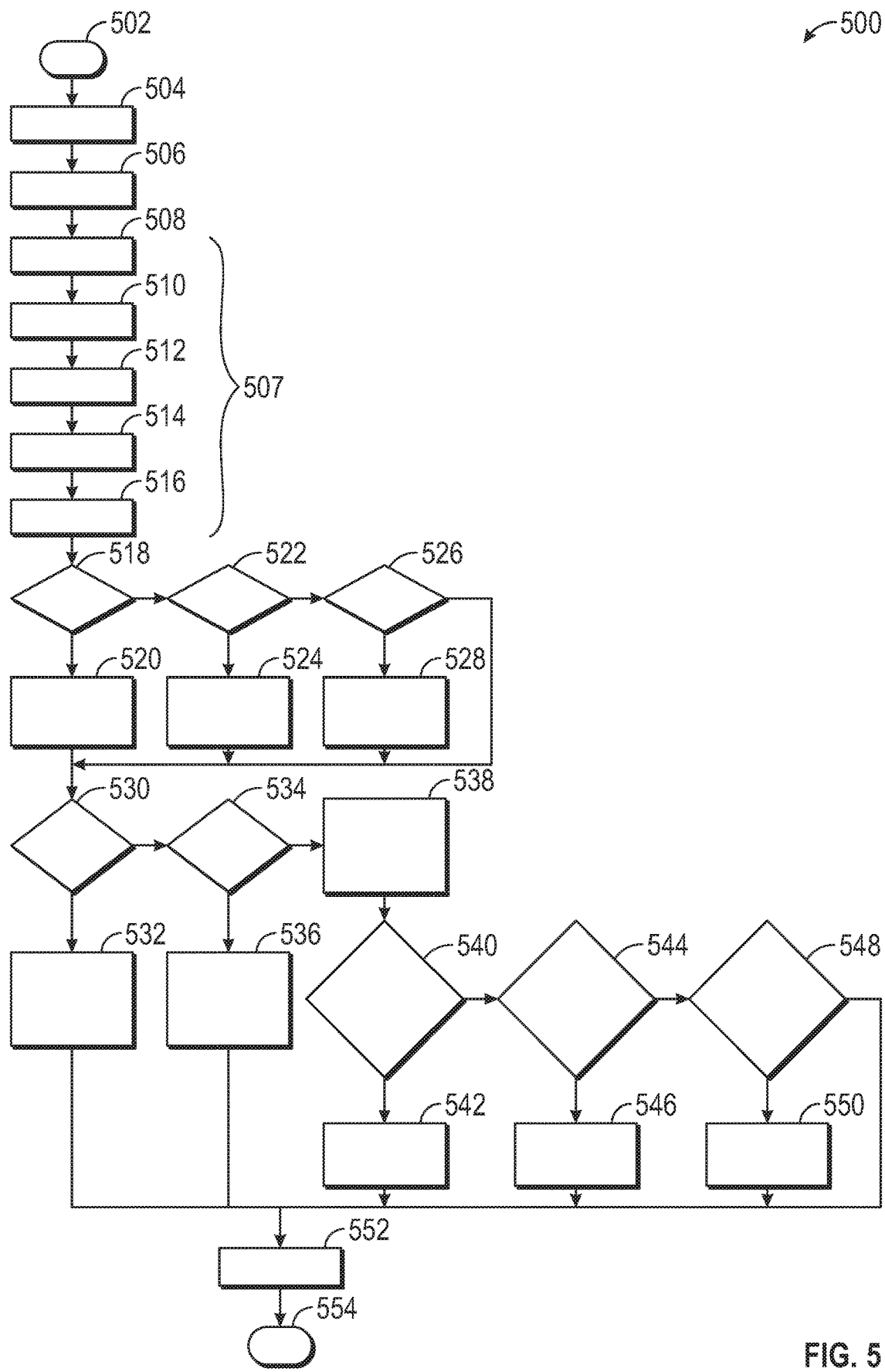
FIG. 5 is a flowchart for a control process for determining a perception system fault for a vehicle, in accordance with various embodiments.

With reference to FIG. 5, a flowchart is provided for a control process 500 for determining a perception system fault for a vehicle. In accordance with various embodiments, the control process 500 can be implemented in connection with the perception system 100 and vehicle 10 of FIG. 1

(e.g., an autonomous vehicle and/or active safety vehicle), the transportation system 52 of FIG. 2, the autonomous driving system of FIG. 3, and the perception system 400 of FIG. 4.

As can be appreciated in light of the disclosure, the order of operation within the control process 500 is not limited to the sequential execution as illustrated in FIG. 5, but may be performed in one or more varying orders as applicable and in accordance with the present disclosure. In various embodiments, the control process 500 can be scheduled to run based on one or more predetermined events, and/or can run continuously during operation of the vehicle 10.

The control process 500 of FIG. 5 will also be discussed further below with reference to FIGS. 6-12, including (i) an architecture 600 of FIG. 6 for implementing the control process of FIG. 5, in accordance with various embodiments, as described in greater detail further below; and (ii) diagrams of FIGS. 7-12 illustrating exemplary steps of the control process 500 of FIG. 5, in accordance with exemplary embodiments, also as described in greater detail further below.

In various embodiments the control process 500 may begin at 502. In various embodiments, process step 502 occurs when an occupant is within the vehicle 10 and the vehicle 10 begins operation in an automated or non-automated manner.

In various embodiments, the control process 500 is initialized at step 504. In various embodiments, as part of the initialization, each of the determinations of the process 500 are re-set, for example at the start of a new vehicle drive and/or ignition cycle.

Sensor data is obtained at 506. In various embodiments, sensor data is obtained from the various sensors 40a . . . 40n of FIG. 1. For example, in various embodiments, sensor data is obtained from cameras and/or other visions systems, lidar sensors, radar sensors, and/or one or more other sensors 40a . . . 40n of FIG. 1. Also in various embodiments, the sensor data may pertain to data observations pertaining to surroundings for the vehicle 10 as it travels along a roadway, including information as to the roadway itself and other objects (e.g., other vehicles, bicyclists, pedestrians, and so on) that are also utilizing the roadway. Also in certain embodiments, the sensor data of 506 is obtained via the detection module 410 of FIG. 4 as sensor data 412 of FIG. 4, and corresponding outputs are provided as observational data 415 to the processing module 420 for processing.

Various indicators are determined and utilized with respect to potential errors in a perception system for the vehicle 10 (e.g., the perception system 100 of FIG. 1 and/or the perception system 400 of FIG. 4), in what is designated as a combined step 507 of FIG. 5. Specifically, in various embodiments, these include indicators pertaining to: (i) potential false negative faults (e.g. mis-detection due to corner cases of neural network) (step 508); (ii) potential false positive faults (e.g. false detection due to corner cases of neural network) (step 510); (iii) potential processing time faults (e.g. lagging processing) (step 512); (iv) potential temporal change faults (e.g. data freeze) (step 514); and (v) potential spatial variance faults (e.g. data missing) (step 516), each of which are described in turn below.

Figure 6:
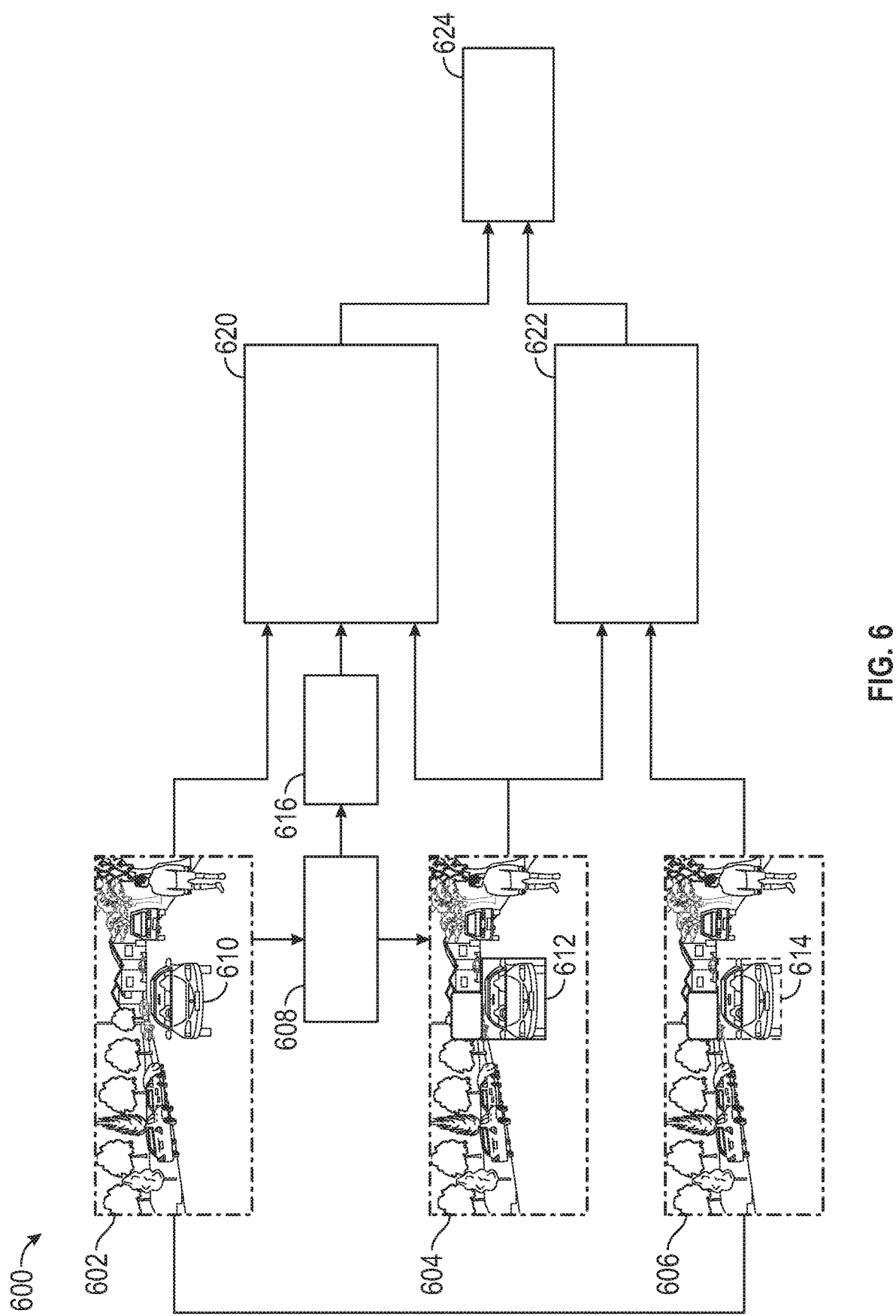
FIG. 6 is a diagram of an architecture for implementing the control process of FIG. 5, in accordance with various embodiments.

With reference to FIG. 6, an exemplary architecture 600 is provided with respect to the control process 500 of FIG. 5 and the combined step 507 thereof, in accordance with various embodiments. In various embodiments, a raw image 602 is obtained via one or more sensors of the vehicle (e.g., a camera of the sensors 40 of FIG. 1), and is processed by the processing system (e.g., via a processor thereof, such as the processor 44 of FIG. 1) to generate perception results 604 for the raw image 602. A ground truth 606 is also obtained for the image, representing a measure of true or known information (such as from a human or other known source). In various embodiments, an object 610 is detected as part of the sensor data, and is represented by perception results object information 612 (as generated via processing by the perception system) and ground truth object information 614 (as confirmed by the human or other known source).

Also as depicted in FIG. 6, in various embodiments, a number of first indicators 620 are generated via the raw image 602 and the perception results 604. In various embodiments, the first indicators 620 include processing time, spatial variance, and temporal change, as described in greater detail further below. Also in various embodiments, a number of second indicators 622 are generated via the perception results 604 and the ground truth 606. In various embodiments, the second indicators 622 include potential false negative and false positive indicators. In addition, also as depicted in FIG. 6, in various embodiments, the first and second indicators 620, 622 are utilized to determine one or more fault types 624 for the perception system (e.g., potentially including corner cases, data freeze, data missing, and/or timing issues, among other possible faults).

With reference back to FIG. 5, potential false negative faults indicators and potential false positive faults indicators are determined in steps 508 and 510, respectively. In various embodiments, the processor 44 of FIG. 4 (and/or the processing module 420 of FIG. 4) determines potential false negative faults indicators and potential false positive faults indicators using techniques illustrated in FIGS. 7-11 and described below in connection thereof.

Figure 7:
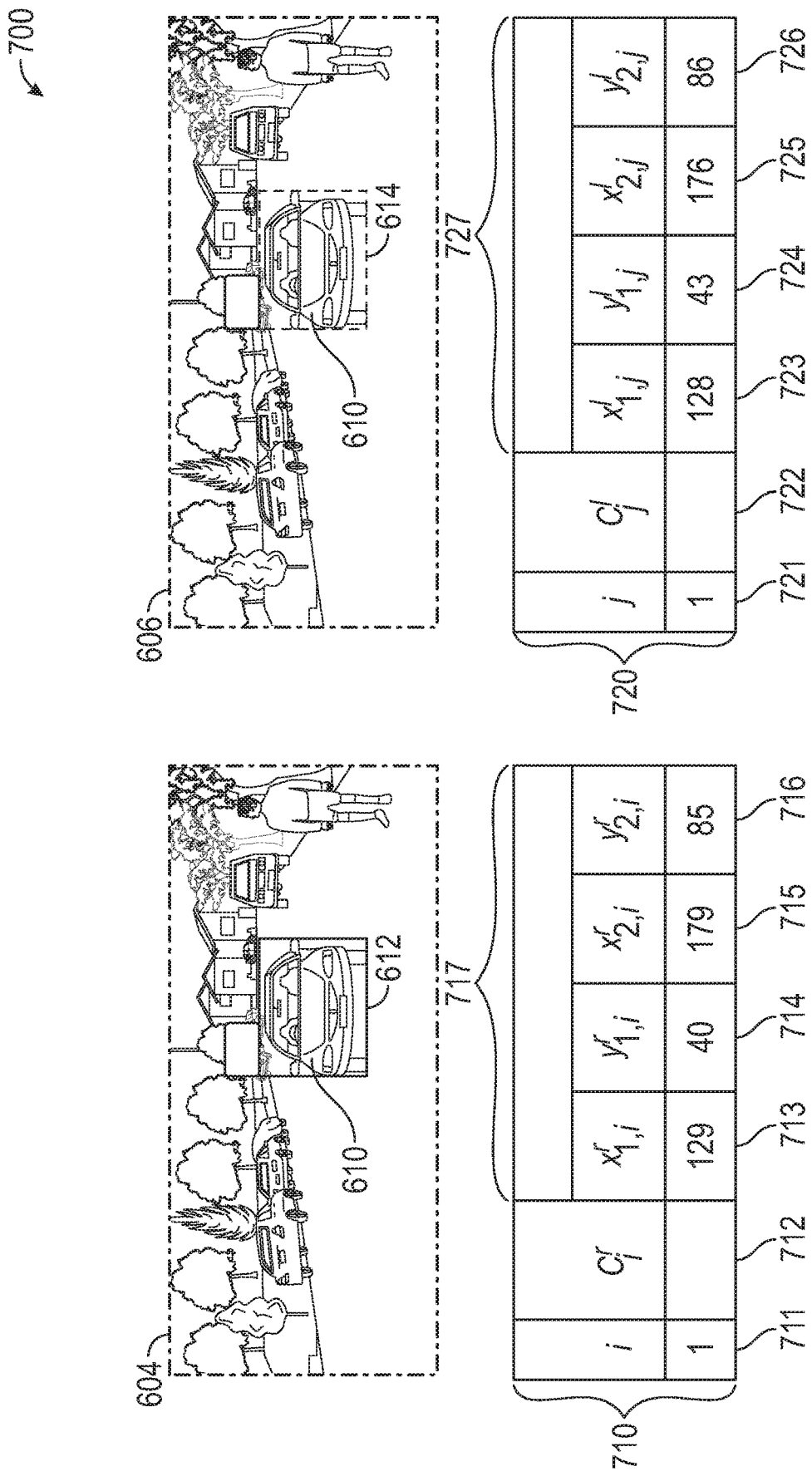
FIGS. 7-12 are diagrams illustrating exemplary steps of the control process of FIG. 5, in accordance with exemplary embodiments.

First, with reference to FIG. 7, the perception results 604 and the ground truth 606 are utilized with respect to the detected object 610 of FIG. 6. Specifically, in various embodiments, first information 710 is generated for the perception results 604 with respect to the perception results object information 612, and second information 720 is generated for the ground truth 606 with respect to the ground truth object information 614.

As shown in FIG. 7, in various embodiments, the first information 710 includes a first identification 711 (e.g., of the object), a first class 712 (of the object 610), and a first bounding box 717, all from the perception results object information 612. In various embodiments, (i) the first identification 711 includes an identifier of the particular object (e.g., "1"); and (ii) the first class 712 represents a class (or type) of the detected object 610 (e.g., "car') based on the perception results 604. Also in various embodiments, the first bounding box 717 includes four bounding locations for the detected object 610 as it appears on the perception results 604, including: (i) a first x-coordinate 713 (also denoted as $x^r_{1,i}$); (ii) a first y-coordinate 714 (also denoted as $y^r_{1,i}$); (iii) a second x-coordinate 715 (also denoted as $x^r_{2,i}$); and (iv) a second y-coordinate 716 (also denoted as $y^r_{2,i}$).

Similarly, also as shown in FIG. 7, in various embodiments, the second information 720 includes a second identification 721 (e.g., of the object), a second class 722 (of the object 610), and a second bounding box 727, all from the ground truth information 614. In various embodiments, (i) the second identification 721 includes an identifier of the particular object (e.g., "1"); and (ii) the second class 722 represents a class (or type) of the detected object 610 (e.g., "car') based on the ground truth information 606. Also in various embodiments, the second bounding box 727 includes four bounding locations for the detected object 610 as it appears on the ground truth 606, including: (i) a first x-coordinate 723 (also denoted as $x^1_{1,j}$); (ii) a first y-coordinate 724 (also denoted as $y^1_{1,j}$); (iii) a second x-coordinate 725 (also denoted as $x^1_{2,j}$); and (iv) a second y-coordinate 726 (also denoted as $y^1_{2,j}$).

Figure 8:
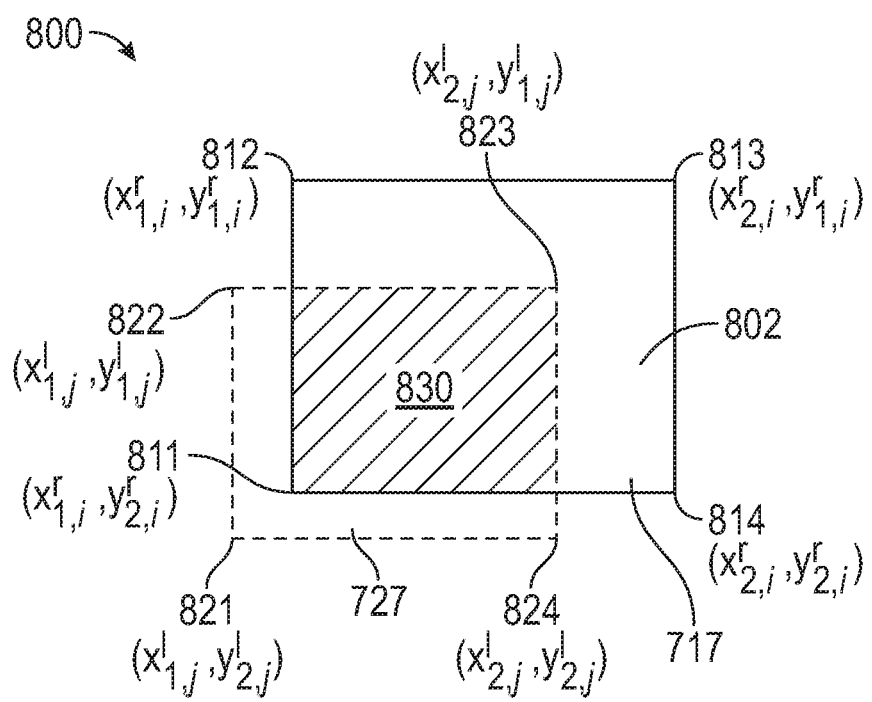

With reference to FIG. 8, an illustration 800 is provided with respect to the first bounding box 717 (from the perception results 604) and the second bounding box 727 (from the ground truth 606) of FIG. 7.

As shown in FIG. 8, in various embodiments, the first bounding box 717 (from the perception results 604) is formed by four corners based on parings of the x-coordinates 713, 715 with y-coordinates 714, 716 from FIG. 7. Specifically, as shown in FIG. 8, the first bounding box 717 includes a lower left corner (or first corner) 811 (also depicted as $x^r_{1,i}$, $y^r_{2,i}$); an upper left corner (or second corner) 812 (also depicted as $x^r_{1,i}$, $y^r_{1,i}$); an upper right corner (or third corner) 813 (also depicted as $x^r_{2,i}$, $y^r_{1,i}$); and a lower right corner (or fourth corner) 814 (also depicted as $x^r_{2,i}$, $y^r_{2,i}$).

In addition, also as shown in FIG. 8, in various embodiments, the second bounding box 727 (from the ground truth 606) is formed by four corners based on parings of the x-coordinates 723, 725 with y-coordinates 724, 726 from FIG. 7. Specifically, as shown in FIG. 8, the second bounding box 727 includes a lower left corner (or first corner) 821 (also depicted as $x^1_{1,j}$, $y^1_{2,j}$); an upper left corner (or second corner) 822 (also depicted as $x^1_{1,j}$, $y^1_{1,j}$); an upper right corner (or third corner) 823 (also depicted as $x^1_{2,j}$, $y^1_{1,j}$); and a lower right corner (or fourth corner) 824 (also depicted as $x^1_{2,j}$, $y^1_{2,j}$).

FIG. 8 also depicts an area of intersection 830 between the first and second bounding boxes 717, 727. In various embodiments, the area of intersection 830 serves as a measure of correlation between the first and second bounding boxes 717, 727. In addition, in various embodiments, the correlation between the first and second boxes 717, 727 is represented in accordance with the following equation:

$$b_{cor_{ij}} = \frac{\text{area of intersection}}{\text{area of union}}, \quad \text{(Equation 1)}$$

in which $cor_{ij}$ represents the correlation between the first and second bounding boxes 717, 727.

Figure 9:
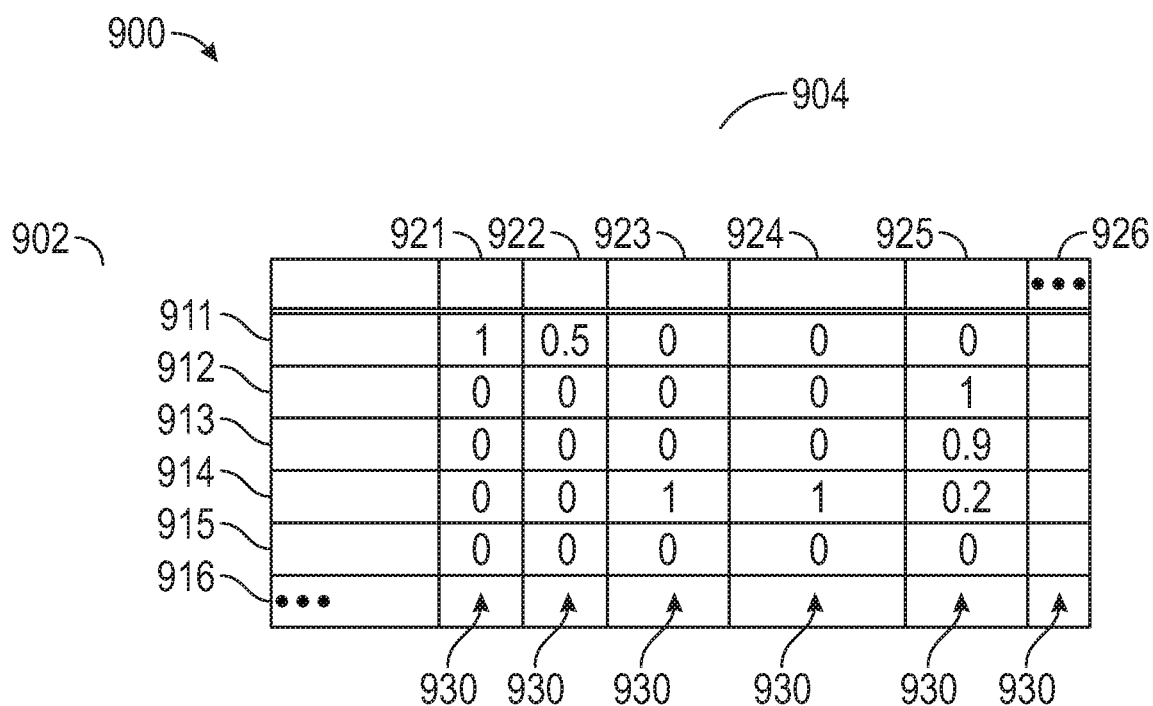

With reference to FIG. 9, a table 900 is provided that shows perception results classifications 902 (from the perception results 604 of FIG. 6) versus ground truth classifications 904 (from the ground truth 606 of FIG. 6).

In an exemplary embodiment, the perception results classifications 902 include: (i) a first classification 911 (e.g., a car); (ii) a second classification 912 (e.g., a bicycle); (iii) a third classification 913 (e.g., a motorbike); (iv) a fourth classification 914 (e.g., a person); (v) a fifth classification 915 (e.g., a boat), and any number of additional classifications 916.

Likewise, also in an exemplary embodiment, the ground truth classifications 904 include (in a corresponding sequence): (i) a first classification 921 (e.g., a car); (ii) a second classification 922 (e.g., a van); (iii) a third classification 923 (e.g., a person); (iv) a fourth classification 924 (e.g., a pedestrian; (v) a fifth classification 925 (e.g., a cyclist), and any number of additional classifications 926.

As shown in FIG. 9, various numerical values 930 within the chart show relative degrees of similarity between the respective classifications of the perception results classifications 902 as compared with the ground truth classifications 904. Also in various embodiment, a value of one ("1") denotes an exact correspondence; a value of zero ("0") denotes no correspondence, and various numbers between zero and one represent varying degrees of correspondence, between the respective classifications of the perception results classifications 902 as compared with the ground truth classifications 904. For example, if both classifications pertain to a "car" (e.g., respective classifications 911 and 921), then the resulting numerical value of one ("1") represents an exact correspondence. By way of additional example, if one classification is for a boat (e.g., classification 915) and a corresponding classification is for a car (e.g. 921), then the resulting numerical value of zero ("0") represents a zero correspondence. By way of another example, if one classification is for a car (e.g., classification 911) and a corresponding classification is for a van (e.g. 922), then the resulting numerical value of 0.9 represents an imperfect but relatively strong correlation. In contrast, by way of further example, if one classification is for a person (e.g., classification 914) and a corresponding classification is for a cyclist (e.g. 925), then the resulting numerical value of 0.2 represents a partial but relatively weak correlation, and so on.

Also in various embodiments, the class correlation between respective classifications is express in terms of the following equation:

$$c\_cor_{i,j} = \text{lookup}(C_i^r, C_j^j) \quad \text{(Equation 2)}$$

In various embodiments, the determinations with respect to false negative faults and false positive faults are made for the perception system, for the various images, based on both the bounding box correlations of Equation 1 above, and the respective class correlations of Equation 2 above.

Figure 10:
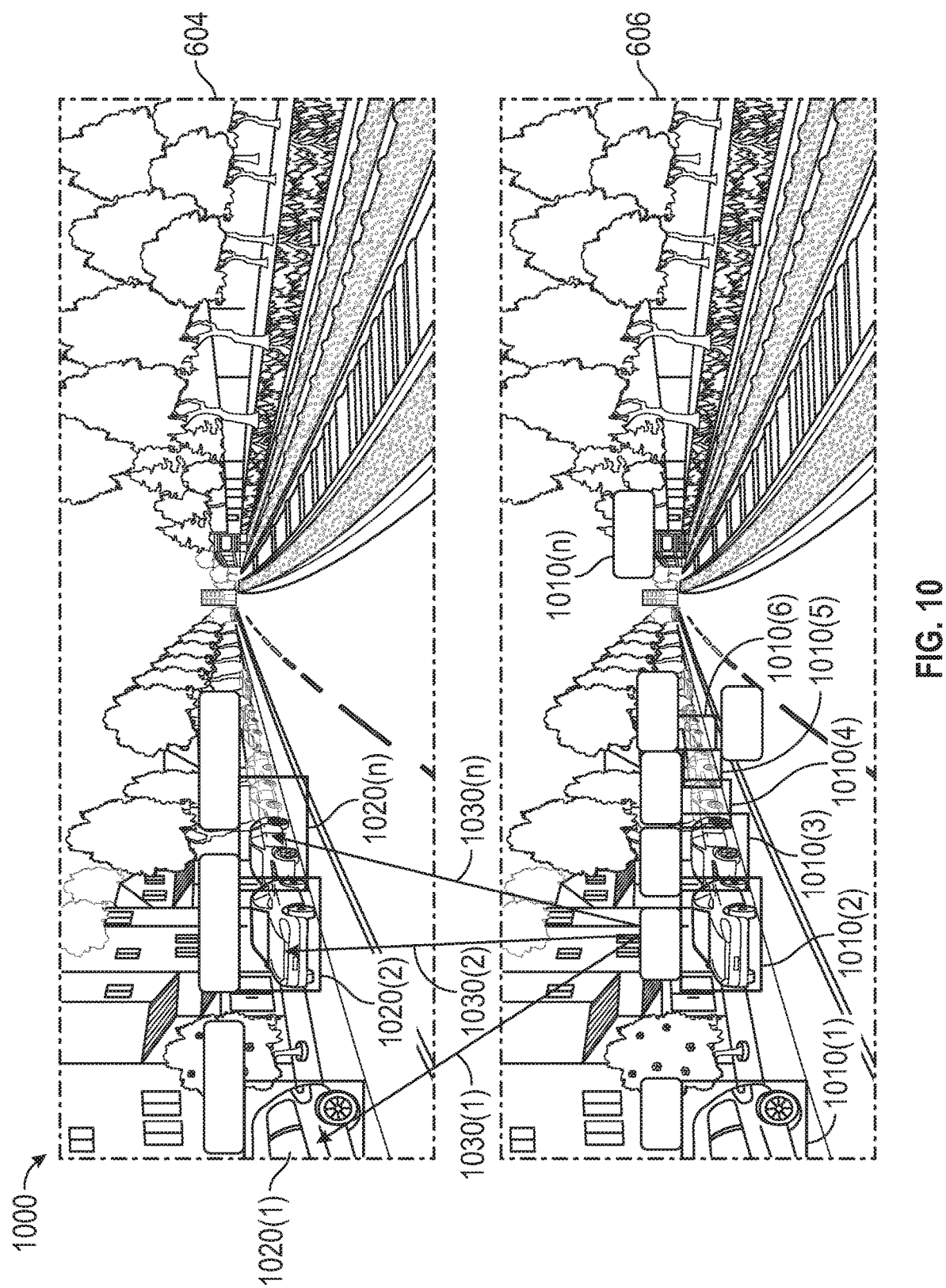
Figure 11:
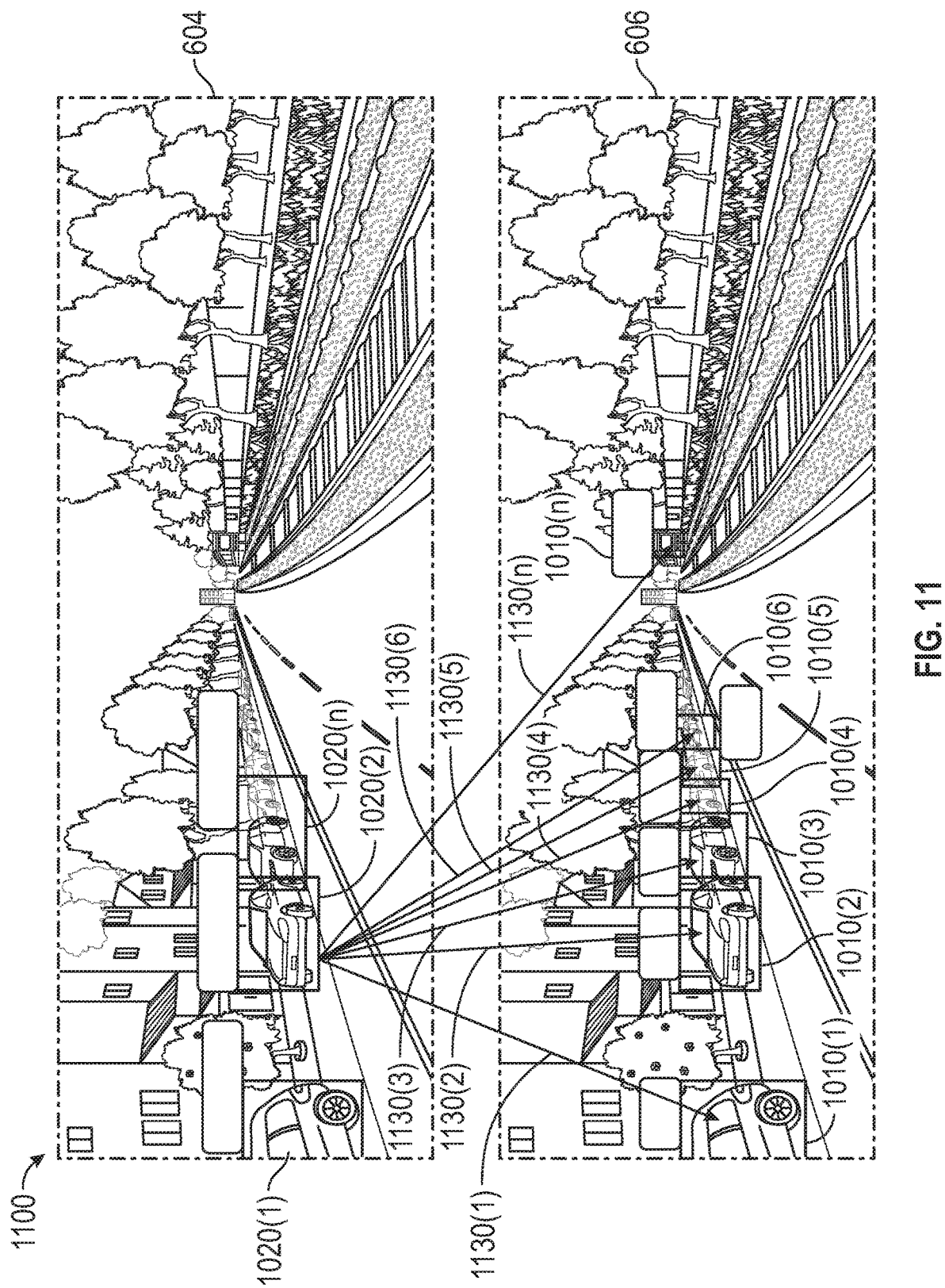

With reference to FIGS. 10 and 11, in various embodiments, the information from FIGS. 7-9 is utilized for assessing potential false negative faults and false positive results, in accordance with exemplary embodiments. Specifically, as shown in both FIGS. 10 and 11, various ground truth objects (represented by both bounding boxes and classes) 1010(1), 1010(2), 1010(3), 1010(4), 1010(5), 1010(6), . . . , 1010(n) are generated with respect to different ground truth objects from the ground truth results 606 (e.g., from FIG. 6). Also as shown in FIG. 10, various detected objects (represented by both bounding boxes and classes) 1020(1), 1020(2), . . . , 1020(n) are generated with respect to different detected objects from the perception results 604 (e.g., from FIG. 6)

With respect to step 508 of FIG. 5, a determination is made as to potential false negative faults (for example, by the processor 44 of FIG. 1 and/or the detection module 420 of FIG. 4). In various embodiments, and with further reference specifically to FIG. 10, in order to determine potential false negative faults, prospective correspondences 1030(1), 1030(2), . . . , 1030(n) are made, for each of the ground truth objects 1010, with respect to each of the detected objects 1020. Specifically, for each prospective correspondence 1030, a bounding box correlation is calculated (using Equation 1, above) between the ground truth bounding box of a particular ground truth object 1010 and the perception bounding box of one of the detected objects 1020. In addition, for each prospective correspondence 1030, a class correlation is calculated (using Equation 2, above) between the ground truth class of a particular ground truth object 1010 and the perception class of one of the detected objects 1020. The prospective correspondence 1030 between a ground truth object 1010(j) and a detected object 1020(i) is the product $b\_cor_{i,j} \cdot c\_cor_{i,j}$.

Specifically, for a particular ground truth object 1010 (e.g., say 1010(1)), prospective correspondences are calculated, separately, between the particular ground truth object 1010 and each of the detected objects 1020. A determination is then made, for the particular ground truth object 1010 being examined, as to which of the detected objects 1020 has the closest correlation with the particular ground truth object 1010 being examined, thereby comprising a matching pair, in accordance with the following equation:

$$cor_j = \max_i(b\_cor_{i,j} \cdot c\_cor_{i,j}) \qquad \text{(Equation 3)}$$

For the matching pair, Equation 3 calculates the matching pair correlation, which represents the maximum correspondence between any detected objects and a given ground truth object 1010(j). It also represents how much of the given ground truth object 1010(j) is detected as in the perception result 604. In various embodiments, these actions are repeated with respect to each of the ground truth objects 1010 (i.e., finding the closest corresponding detected object 1020 to generate a matching pair, and determining the matching pair correlation. Also in various embodiments, the false negative fault score is calculated by aggregating the correlations for each of the matching pairs, in accordance with the following equation:

$$FN = \frac{1}{J}\sum_j (1 - cor_j) \qquad \text{(Equation 4)}$$

Next, with respect to step 510 of FIG. 5, a determination is made as to potential false positive faults (for example, by the processor 44 of FIG. 1 and/or the processing module 420 of FIG. 4). In various embodiments, and with further reference specifically to FIG. 11, in order to determine potential false positive faults, prospective correspondences 1130(1), 1130(2), 1130(3), 1130(4), 1130(5), 1130(6), . . . , 1130(n) are made, for each of the detected objects 1020, with respect to each of the ground truth objects 1010. Specifically, for each prospective correspondence 1130, a bounding box correlation is calculated (using Equation 1, above) between a particular perception bounding box of detected objects 1020 and the ground truth bounding box of one of the ground truth objects 1010. In addition, for each prospective correspondence 1030, a class correlation is calculated (using Equation 2, above) between the perception class of one of the detected objects 1020 and the ground truth class of a particular ground truth object 1010. The prospective correspondence 1030 between a detected object 1020(i) and a ground truth object 1010(j) is the product $b\_cor_{i,j} \cdot c\_cor_{i,j}$.

Specifically, for a particular detected object 1020 (e.g., say 1020(1)), prospective correspondences are calculated, separately, between the particular detected object 1020 and each of the ground truth objects 1010. A determination is then made, for the particular detected object 1020 being examined, as to which of the ground truth objects 1010 has the closest correlation with the particular detected object 1020 being examined, thereby comprising a matching pair, in accordance with the following equation:

$$cor_i = \max_j(b\_cor_{i,j} \cdot c\_cor_{i,j}) \qquad \text{(Equation 5)}$$

For the matching pair, Equation 5 calculates the matching pair correlation, which represents the maximum correspondence between any ground truth objects and a given detected object 1020(i). It also represents how much of the detected object 1020(i) is constant with the ground truth 606. In various embodiments, these actions are repeated with respect to each of the detected objects 1020 (i.e., finding the closest corresponding ground truth objects 1010 to generate a matching pair, and then determining the matching pair correlation. Also in various embodiments, the false positive fault score is calculated by aggregating the correlations for each of the matching pairs, in accordance with the following equation:

$$FP = \frac{1}{I}\sum_i (1 - cor_i) \qquad \text{(Equation 6)}$$

With reference back to FIG. 5, in various embodiments, potential processing times (and/or possible corresponding faults) are determined at step 512. In various embodiments, these determinations are made by the processor 44 of FIG. 1 and/or the processing module 420 of FIG. 4. Specifically, in certain embodiments, a determination is made as to an amount of time "$t_k$" taken by the processor in processing frame "k" from the optical images for the perception results. In certain embodiments, if this amount of time $t_k$ exceeds a predetermined threshold, then this may be indicative of a time processing error.

Also in various embodiments, temporal change values (and/or possible associated faults) are determined at step 514. In various embodiments, these determinations are made by the processor 44 of FIG. 1 and/or the processing module 420 of FIG. 4. Specifically, in various embodiments, a determination is made as to a difference between respective variables (e.g., inputs, outputs, or internal variables) of the neural network model between consecutive frames in the optical images, comprising the temporal change values.

Figure 12:
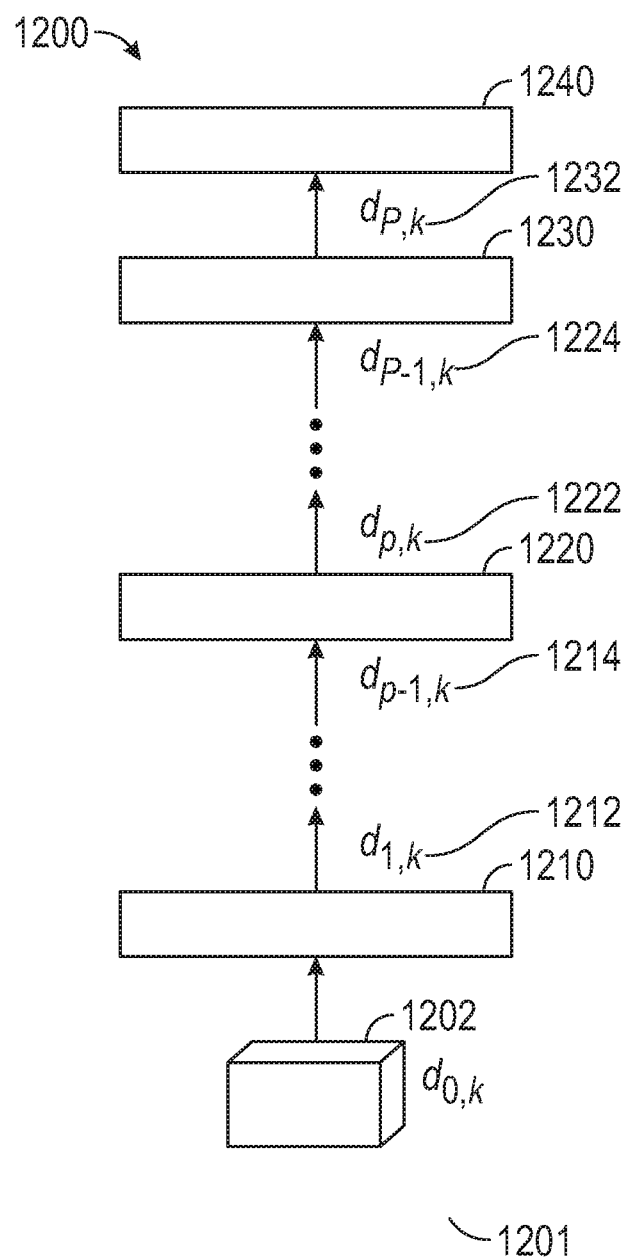

Specifically, with reference to FIG. 12, in various embodiments, the temporal change values (and/or possible associated faults) may be analyzed with respect to different layers of the neural network model, including the raw image 1201; internal variables 1202 for the raw image 1201; one or more first layers 1210 for the neural network model, one or more second layers 1220 for the neural network model; internal variables 1212, 1214 between the first and second layers 1210, 1220, one or more additional layers 1230 for the neural network model; internal variables 1222, 1224 between layers 1220 and 1230; the perception results 1240, and internal variables 1232 between layer 1230 and the perception results 1240. Also in various embodiments, the temporal change is evaluated with respect to a potential data freeze for the neural network model.

In various embodiments, the temporal change is calculated in accordance with the following equation:

$$\Delta_{p,k} = \underset{l,m,n}{\text{mean}}\{(d_{p,k}(l, m, n) - d_{p,k-1}(l, m, n))^2\}, \qquad \text{(Equation 7)}$$

in which "$d_{p,k}$" represents the data value of layer p of the neural network with respect to frame k in the optical images. $d_{p,k-1}$ represents the data value of layer p of the neural network with respect to frame k−1 in the optical images. l, m and n are the indices of each variable in the data matrix of $d_{p,k}$ and/or $d_{p,k-1}$.

In addition, in various embodiments, potential spatial variance faults are determined at step 516. In various embodiments, these determinations are made by the processor 44 of FIG. 1 and/or the processing module 420 of FIG. 4. In variance embodiments, determinations are made as to the intensity of pixels within a current frame of the optical image. In certain embodiments, if the intensity of pixels within the current frame are each identical, then this can serve as an indication of a possible black frame, for example, resulting from data loss.

In various embodiments, the spatial variance is calculated using the following equations:

$$\mu_{p,k,l} = \underset{m,n}{\text{mean}}\{d_{p,k}(l, m, n)\}; \quad \text{(Equation 8)}$$

$$\sigma^2_{p,k,l} = \underset{m,n}{\text{mean}}\{(d_{p,k}(l, m, n) - \mu_{p,k,l})^2\}; \text{ and} \quad \text{(Equation 9)}$$

$$\sigma^2_{p,k} = \underset{l}{\text{mean}}\{\sigma^2_{p,k,l}\}. \quad \text{(Equation 10)}$$

In this equation, $d_{p,k}$ represents the data value of layer p of the neural network with respect to frame k in the optical images. l, m and n are the indices of each variable in the data matrix $d_{p,k}$. l is the index of the channel, and m and n are the indices of rows and columns. $\mu_{p,k,1}$ represents the mean value of variables in channel l in $d_{p,k}$. Also in this equation, $\sigma_{p,k,l}^2$ represents the variance value of variables in channel l in $d_{p,k}$, and $\sigma_{p,k}^2$ represents the spatial variance of $d_{p,k}$, which is the mean value of variances of all channels in $d_{p,k}$.

With reference back to FIG. 5, in various embodiments, a determination is made at step 518 as to whether a perception time $t_k$ (e.g., a time to process the images in the perception system, of step 512) is less than a first predetermined threshold. If it is determined at step 518 that the perception time is less than the first predetermined threshold, then a low timing fault indication is made at step 520. Specifically, in various embodiments, a timing fault is determined to be unlikely, and therefore a timing fault indicator is set to a first level (e.g., corresponding to the color green) in one embodiment.

Conversely, if it is determined that the perception time is greater than or equal to the first predetermined threshold, then a determination is made at step 522 as to whether the perception time is greater than a second predetermined threshold. In one embodiment, the second predetermined threshold is greater than the first predetermined threshold.

If it is determined at step 522 that the perception time is greater than the second predetermined threshold, then a high timing fault indication is made at step 524. Specifically, in various embodiments, a timing fault is determined to be likely, and therefore the timing fault indicator is set to a second level (e.g., corresponding to the color red) that is greater than the first level of step 520 in one embodiment.

Conversely, if it is determined that the perception time is less than the second predetermined threshold, then a determination is made at step 526 as to whether the perception time is greater than a third predetermined threshold. In one embodiment, the third predetermined threshold is greater than the first predetermined threshold and less than the second predetermined threshold.

If it is determined at step 526 that the perception time is greater than the third second predetermined threshold, then a medium timing fault indication is made at step 528. Specifically, in various embodiments, a timing fault is determined to be somewhat likely or significant, and therefore the timing fault indicator is set to a third level (e.g., corresponding to the color yellow) that is greater than the first level of step 520 and less than the second level of step 524.

In various embodiments, the perception times and analysis thereof are performed by one or more processors, such as the processor 44 of FIG. 1 and/or the processing module 420 of FIG. 4. Also in various embodiments, the different indicators of potential perception time fault (e.g., low, medium, high) may be representative of respective probabilities and/or severities of processing faults for the perception system 100 (e.g., of faults with the processor 44, neural network model 50, processing module 420, and/or components thereof).

Next, in various embodiments, a determination is made at step 530 as to whether a spatial variance (e.g., a measure of variance in pixel intensity for different pixels in a particular frame/optical image, per the discussion above) is equal to zero. If it is determined at step 530 that the spatial variance is equal to zero, then a high spatial variance fault indication is made at step 532. Specifically, in various embodiments, a spatial variance fault, namely, a data missing fault, is determined to be likely, and therefore a data missing fault indicator is set to a high level (e.g., corresponding to the color red) in one embodiment, and the process proceeds to step 552 (described further below). Conversely, if the spatial variance is not equal to zero, then a spatial variance fault is determined to not be likely, and the process proceeds instead to step 534, described below.

A determination is made at step 534 as to whether a temporal change (e.g., a measure of change in variables between consecutive frames) is equal to zero. If it is determined at step 534 that the temporal change is zero then a high temporal change fault indication is made at step 536. Specifically, in various embodiments, a temporal change fault, namely, a data freeze fault, is determined to be likely, and therefore a data freeze fault indicator is set to a high level (e.g., corresponding to the color red) in one embodiment, and the process proceeds to step 552 (described further below). Conversely, if the temporal change is not equal to zero, then the data freeze fault is determined to not be likely, the data freeze indicator is set to low (e.g., as represented by the color green), and the process proceeds instead to step 540, described below.

In various embodiments, the spatial variance and temporal change and analysis thereof are performed by one or more processors, such as the processor 44 of FIG. 1 and/or the processing module 420 of FIG. 4. Also in various embodiments, the data freeze fault indicator is determined to be low (i.e., green) if both the spatial variance and the temporal change are not equal to zero.

At step 540, determinations are made as to whether the false negative indicator of step 508 and the false positive indicator of step 510 are both less than respective first corner case thresholds. If this determination is "yes", then the corner case fault is determined to be low (e.g., corresponding to the color green) at step 542, and the process proceeds to step 552, described further below.

Conversely, if it is determined at 540 that either one of the false negative indicator or false positive indicator, or both, are greater than or equal to their respective first thresholds of step 540, then further determinations are made at step 544 as to whether the false negative indicator of step 508 or the false positive indicator of step 510 is greater than respective second corner case thresholds. In various embodiments, the second thresholds of step 544 are greater than the respective first thresholds of step 540. If this determination in step 544 is "yes", then the corner case fault is determined to be high (e.g., corresponding to the color red) at step 546, and the process proceeds to step 552, described further below.

Conversely, if it is determined at 544 that both the false negative indicator and false positive indicator, are less than or equal to their respective second thresholds of step 544, then further determinations are made at step 548 as to whether the false negative indicator of step 508 or the false positive indicator of step 510 is greater than respective third corner case thresholds. In various embodiments, the third thresholds of step 548 are greater than the respective first thresholds of step 540 but less than the respective second thresholds of step 544. If this determination in step 548 is "yes", then the corner case fault is determined to be medium (e.g., corresponding to the color yellow) at step 550, and the process proceeds to step 552, described directly below.

During step 552, one or more vehicle control actions are provided, in accordance with exemplary embodiments. For example, in certain embodiments, if one or more of the above-described fault levels is at or above a certain predetermined level (e.g., yellow in certain embodiments, and/or red in other embodiments), then the processor 44 proceeds instructions for one or more systems (e.g., the actuator system, the braking system, the steering system, and so on) to relinquish control to a human operator or driver of the vehicle 10, instead of automated computer control, in view of the fault(s). In certain other embodiments, the vehicle 10 may maintain automatic control, but may change a manner of executing such control (e.g., by relying on a secondary device and/or system, such as a secondary camera, and/or by implementing controls more cautiously in view of the determined fault). In yet other embodiments, the vehicle 10 may continue to learn, for example via artificial intelligence and/or training, to improve the neural network model 50 for future uses (e.g., to make appropriate adjustments when similar events may occur in the future, and so on). Also in various embodiments, the process may terminate at step 554.

Accordingly, in various embodiments, methods, systems, and vehicles are provided for the execution of a perception system fault for a vehicle, such as an autonomous vehicle or active safety vehicle. As set forth in greater detail above, in various embodiments, determinations are made with respect to different types of potential faults for the perception system of the vehicle, using different respective techniques, and the results are utilized to execute one or more control actions for the vehicle.

It will be appreciated that, in various embodiments, the vehicles, systems, and components depicted in the drawings and described above may vary. It will similarly be appreciated that the steps, implementations, and examples depicted in the drawings and described above may also vary, and/or may be performed in a different order or sequence, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining, via one or more sensors, sensor data pertaining including one or more images of one or more detected objects in proximity to a vehicle;
   processing the one or more images via a neural network model of a perception system of the vehicle, generating perception results for the one or more images;
   analyzing, via a processor, a plurality of potential faults in the perception system, based on the perception results, using a respective different technique for each of the plurality of potential faults, for the neural network model;
   determining a fault of the plurality of potential faults, via the processor, based on the analyzing; and
   taking a vehicle control action with respect to the vehicle, based on the fault, via instructions provided by the processor.

2. The method of claim 1, wherein the step of taking the vehicle control action comprise relinquishing control of one or more automated functions for the vehicle.

3. The method of claim 1, wherein:
   the analyzing of the plurality of faults comprises:
      obtaining a ground truth for the one or more images;
      generating one or more bounding boxes with respect to the perception results and the ground truth for the one or more images, comprising a respective bounding box for each of the one or more detected objects in the one or more images;
      determining a bounding box correlation for each of the one or more bounding boxes; and
      determining a respective class correlation between the perception results and the ground truth for each of the detected objects; and
   the determining of the fault comprises determining whether a false positive fault, a false negative fault, or both for the one or more images are present, based on the bounding box correlations and the respective class correlations.

4. The method of claim 3, wherein:
   the analyzing further comprises determining an amount of time taken by the perception system in processing the one or more images; and
   the determining of the fault further comprises determining whether a processing time fault is present, based on the amount of time.

5. The method of claim 3, wherein:
   the analyzing further comprises determining one or more differences between one or more variables between two consecutive frames of the images; and
   the determining of the fault further comprises determining whether a temporal change fault is present, based on the one or more differences between the one or more variables between the two consecutive frames of the images.

6. The method of claim 3, wherein:
   the analyzing further comprises determining one or more differences in intensity between different pixels within a particular one of the images; and
   the determining of the fault further comprises determining whether a spatial variance fault is present, based on the one or more differences in intensity.

7. The method of claim 3, wherein:
   the analyzing further comprises:
      determining an amount of time taken by the perception system in processing the one or more images;

determining one or more differences between one or more variables between two consecutive frames of the images; and
determining one or more differences in intensity between different pixels within a particular one of the images; and the determining of the fault further comprises:
determining whether a processing time fault is present, based on the amount of time;
determining whether a temporal change fault is present, based on the one or more differences between the one or more variables between the two consecutive frames of the images; and
determining whether a spatial variance fault is present, based on the one or more differences in intensity.

8. A system comprising:
one or more sensors configured to generate sensor data pertaining including one or more images of one or more detected objects in proximity to a vehicle; and
a processor coupled to the one or more sensors and configured to at least facilitate:
processing the one or more images via a neural network model of a perception system of the vehicle, generating perception results for the one or more images;
analyzing a plurality of potential faults in the perception system, based on the perception results, using a respective different technique for each of the plurality of potential faults, for the neural network model;
determining a fault of the plurality of potential faults based on the analyzing; and
providing instructions for taking a vehicle control action with respect to the vehicle, based on the fault.

9. The system of claim 8, wherein the processor is configured to at least facilitate:
obtaining a ground truth for the one or more images;
generating one or more bounding boxes with respect to the perception results and the ground truth for the one or more images, comprising a respective bounding box for each of the one or more detected objects in the one or more images;
determining a bounding box correlation for each of the one or more bounding boxes;
determining a respective class correlation between the perception results and the ground truth for each of the detected objects; and
determining whether a false positive fault, a false negative fault, or both for the one or more images are present, based on the bounding box correlations and the respective class correlations.

10. The system of claim 9, wherein the processor is configured to at least facilitate:
determining an amount of time taken by the perception system in processing the one or more images; and
determining whether a processing time fault is present, based on the amount of time.

11. The system of claim 9, wherein the processor is configured to at least facilitate:
determining one or more differences between one or more variables between two consecutive frames of the images; and
determining whether a temporal change fault is present, based on the one or more differences between the one or more variables between the two consecutive frames of the images.

12. The system of claim 9, wherein the processor is configured to at least facilitate:

determining one or more differences in intensity between different pixels within a particular one of the images; and
determining whether a spatial variance fault is present, based on the one or more differences in intensity.

13. The system of claim 9, wherein the processor is further configured to at least facilitate:
determining an amount of time taken by the perception system in processing the one or more images;
determining one or more differences between one or more variables between two consecutive frames of the images;
determining one or more differences in intensity between different pixels within a particular one of the images;
determining whether a processing time fault is present, based on the amount of time;
determining whether a temporal change fault is present, based on the one or more differences between the one or more variables between the two consecutive frames of the images; and
determining whether a spatial variance fault is present, based on the one or more differences in intensity.

14. A vehicle having autonomous functionality, the vehicle comprising:
one or more sensors configured to generate sensor data pertaining including one or more images of one or more detected objects in proximity to the vehicle;
a processor coupled to the one or more sensors and configured to at least facilitate:
processing the one or more images via a neural network model of a perception system of the vehicle, generating perception results for the one or more images;
analyzing a plurality of potential faults in the perception system, based on the perception results, using a respective different technique for each of the plurality of potential faults, for the neural network model;
determining a fault of the plurality of potential faults based on the analyzing; and
providing instructions for taking a vehicle control action with respect to the vehicle, based on the fault; and
a vehicle actuator system coupled to the processor and configured to implement the vehicle control action in accordance with the instructions provided by the processor.

15. The vehicle of claim 14, wherein:
the processor is configured to at least facilitate providing instructions for relinquishing control of one or more automated functions for the vehicle; and
the vehicle actuator system is configured to at least facilitate implementing the relinquishing of control of the one or more automated functions of the vehicle in accordance with the instructions provided by the processor.

16. The vehicle of claim 14, wherein the processor is further configured to at least facilitate:
obtaining a ground truth for the one or more images;
generating one or more bounding boxes with respect to the perception results and the ground truth for the one or more images, comprising a respective bounding box for each of the one or more detected objects in the one or more images;
determining a bounding box correlation for each of the one or more bounding boxes;
determining a respective class correlation between the perception results and the ground truth for each of the detected objects; and determining whether a false positive fault, a false negative fault, or both for the one or more images are present, based on the bounding box correlations and the respective class correlations.

17. The vehicle of claim 16, wherein the processor is further configured to at least facilitate:
    determining an amount of time taken by the perception system in processing the one or more images; and
    determining whether a processing time fault is present, based on the amount of time.

18. The vehicle of claim 16, wherein the processor is configured to at least facilitate:
    determining one or more differences between one or more variables between two consecutive frames of the images; and
    determining whether a temporal change fault is present, based on the one or more differences between the one or more variables between the two consecutive frames of the images.

19. The vehicle of claim 16, wherein the processor is configured to at least facilitate:
    determining one or more differences in intensity between different pixels within a particular one of the images; and
    determining whether a spatial variance fault is present, based on the one or more differences in intensity.

20. The vehicle of claim 16, wherein the processor is further configured to at least facilitate:
    determining an amount of time taken by the perception system in processing the one or more images;
    determining one or more differences between one or more variables between two consecutive frames of the images;
    determining one or more differences in intensity between different pixels within a particular one of the images;
    determining whether a processing time fault is present, based on the amount of time;
    determining whether a temporal change fault is present, based on the one or more differences between the one or more variables between the two consecutive frames of the images; and
    determining whether a spatial variance fault is present, based on the one or more differences in intensity.

* * * * *